United States Patent
Connelly et al.

(10) Patent No.: US 9,066,129 B2
(45) Date of Patent: Jun. 23, 2015

(54) VIDEO PRESENTATION DEVICE AND METHOD

(75) Inventors: Michael Connelly, Philadelphia, PA (US); Ashley Moran, Philadelphia, PA (US); Tom Loretan, Trumbull, CT (US); Susan Oppelt, Lafayette, CA (US); Srinivasa Rao Makkapati, Bangalorg (IN); Simhachalam Naidu Boddu, Bangalorg (IN)

(73) Assignee: Comcast Cable Communications, LLC, Philadelphia, PA (US)

( * ) Notice: Subject to any disclaimer, the term of this patent is extended or adjusted under 35 U.S.C. 154(b) by 303 days.

(21) Appl. No.: 13/495,262

(22) Filed: Jun. 13, 2012

(65) Prior Publication Data

US 2013/0278706 A1 Oct. 24, 2013

Related U.S. Application Data

(60) Provisional application No. 61/637,487, filed on Apr. 24, 2012.

(51) Int. Cl.
*H04N 7/14* (2006.01)
*H04N 21/431* (2011.01)
*H04N 21/462* (2011.01)

(52) U.S. Cl.
CPC .......... *H04N 21/4316* (2013.01); *H04N 7/147* (2013.01); *H04N 21/4622* (2013.01)

(58) Field of Classification Search
CPC ......... G06F 3/002–3/017; G06F 3/03–3/0325; G06F 3/041–3/0486
USPC .................... 348/14.01–14.16; 370/259–271, 370/351–357; 709/201–207, 217–248
See application file for complete search history.

(56) References Cited

U.S. PATENT DOCUMENTS

| | | | |
|---|---|---|---|
| 7,000,008 B2 * | 2/2006 | Bautista-Lloyd et al. | 709/219 |
| 7,034,807 B2 * | 4/2006 | Maggioni | 345/173 |
| 7,770,115 B2 * | 8/2010 | Gallmeier et al. | 715/716 |
| 8,325,217 B2 * | 12/2012 | Smith et al. | 348/14.13 |
| 2004/0220926 A1 * | 11/2004 | Lamkin et al. | 707/3 |
| 2005/0066365 A1 * | 3/2005 | Rambo | 725/51 |
| 2005/0120391 A1 * | 6/2005 | Haynie et al. | 725/135 |
| 2005/0132420 A1 * | 6/2005 | Howard et al. | 725/135 |
| 2007/0040900 A1 * | 2/2007 | Castles | 348/14.08 |
| 2008/0088698 A1 * | 4/2008 | Patel et al. | 348/14.09 |
| 2010/0037151 A1 * | 2/2010 | Ackerman et al. | 715/753 |
| 2010/0082784 A1 * | 4/2010 | Rosenblatt et al. | 709/222 |
| 2011/0242268 A1 * | 10/2011 | Kim et al. | 348/14.04 |
| 2011/0265123 A1 * | 10/2011 | Morisey | 725/46 |
| 2011/0302532 A1 * | 12/2011 | Missig | 715/823 |
| 2012/0026275 A1 * | 2/2012 | Robinson et al. | 348/14.03 |
| 2012/0159550 A1 * | 6/2012 | Bajpai | 725/44 |
| 2014/0012898 A1 * | 1/2014 | Mittal | 709/203 |

* cited by examiner

*Primary Examiner* — Hemant Patel
(74) *Attorney, Agent, or Firm* — Banner & Witcoff, Ltd.

(57) ABSTRACT

A computing device may include a video input interface and video output interface to allow insertion into a video system. The device may be configured to perform passthrough operation on the incoming video, allowing the incoming signal to appear at the output interface. When overlay video operations are desired, the device may resize the incoming video, generate one or more additional overlays, and generate a modified version of the incoming video signal, where the modified version contains the one or more additional overlays along with (if desired) the original video. The device may have data network connections, and can thereby serve as an easy way, for example, to upgrade an existing video system with network and/or interactive features.

16 Claims, 11 Drawing Sheets

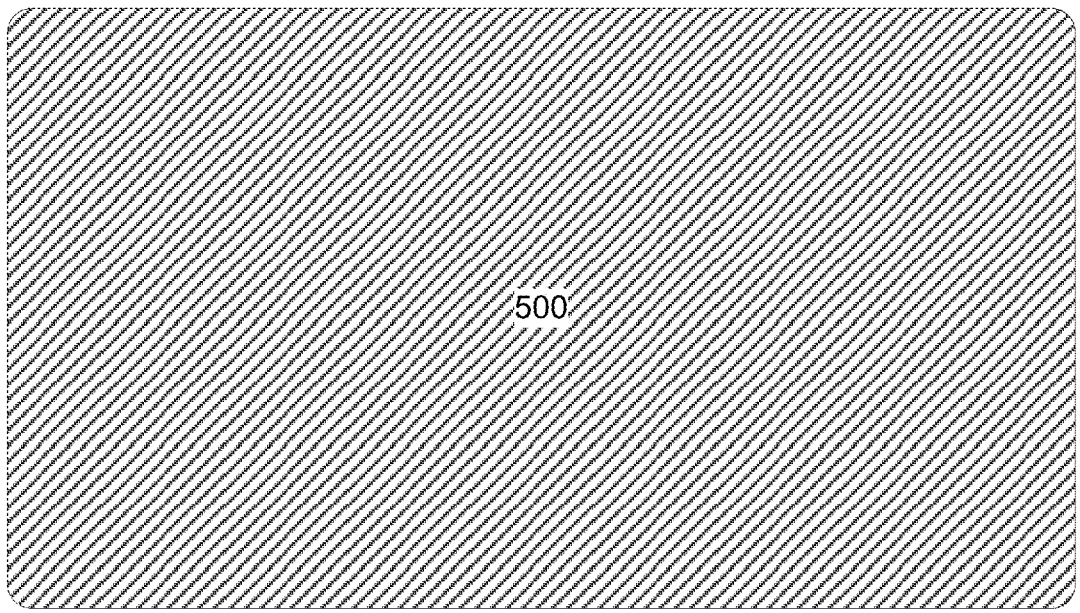
FIG. 5a
FIG. 5b
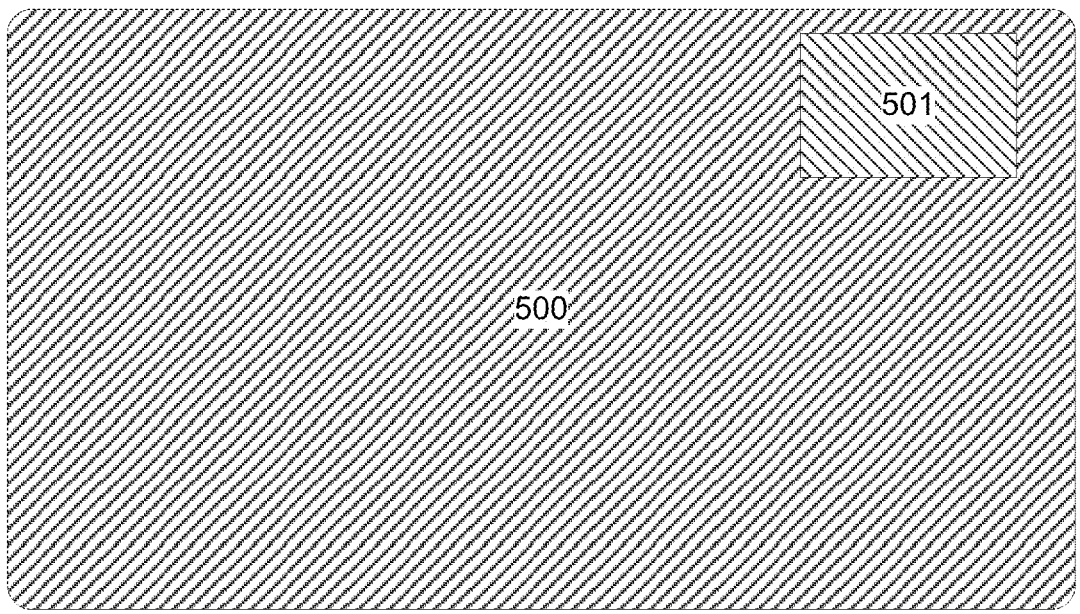

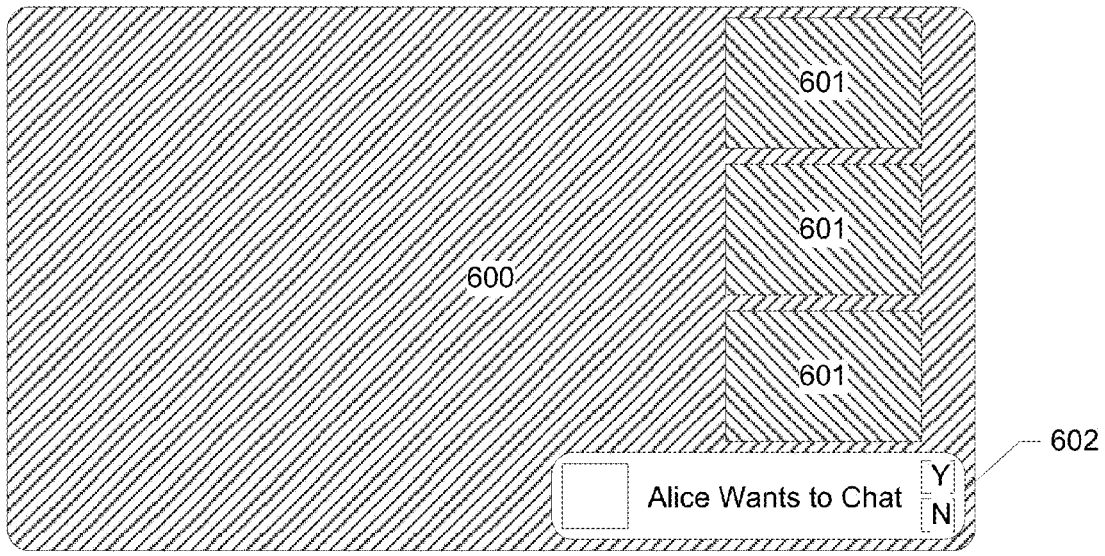
FIG. 6a
FIG. 6b

FIG. 7
FIG. 8
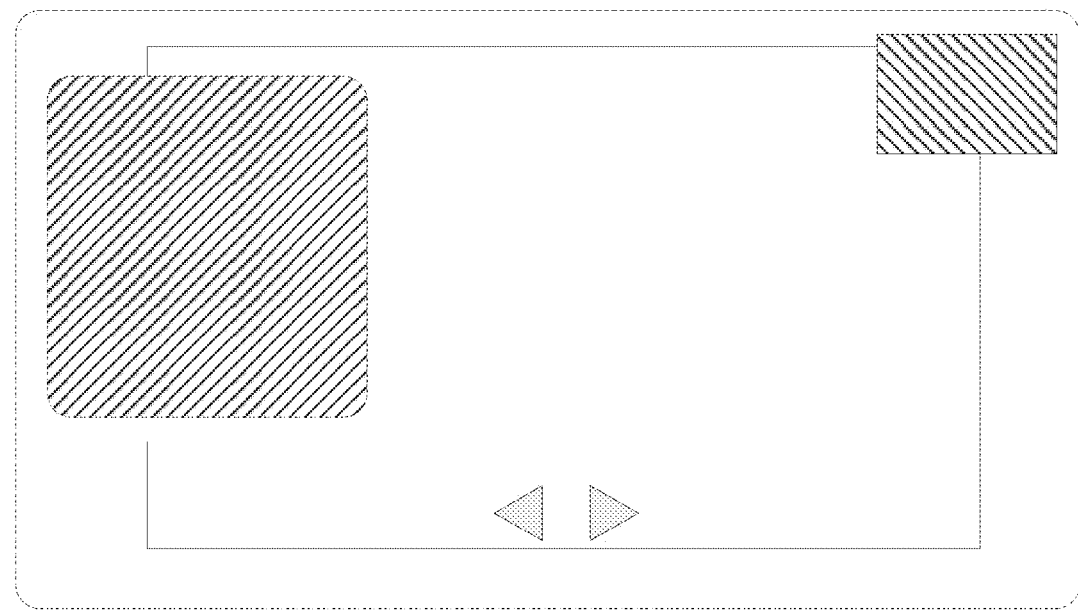

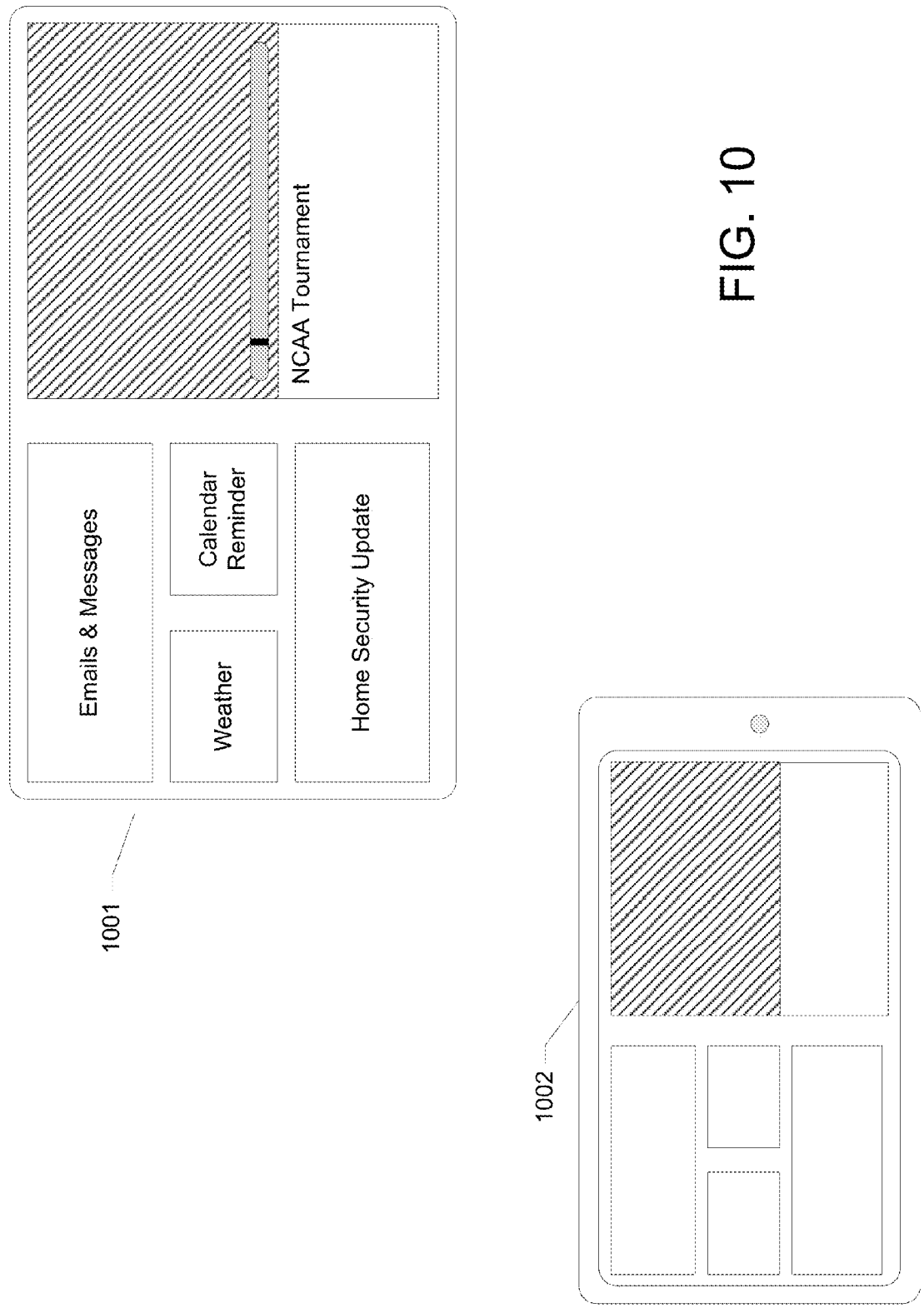

VIDEO PRESENTATION DEVICE AND METHOD

CROSS-REFERENCE TO RELATED APPLICATIONS

The present application claims priority to U.S. Provisional Application No. 61/637,487, filed Apr. 24, 2012, and entitled "Video Adapter Device," the entire contents of which are incorporated herein by reference as an example embodiment.

BACKGROUND

The availability of new information and entertainment services and features continues to grow at a rapid pace, and the latest electronic devices are able to offer a myriad of new options to customers. Electronic hardware, however, is not as easy to update, and there are plenty of users who have resisted getting new stereos, DVD (Digital Versatile Disc) players, gaming consoles and televisions. There remains an ever-present need to support such legacy devices, even as new services and features are introduced.

SUMMARY

Some of the features described herein relate generally to a video adapter device, and associated methods of use, that can serve as a passthrough device for an existing video display signal, and which can overlay additional information and graphics obtained via a network data connection. In one embodiment, the device may include an input video interface conforming to a video standard; an output video interface conforming to the video standard; a network connection; a processor; and a memory, storing instructions that, when executed by the processor, cause the device to perform the following: conduct passthrough video handling of an input video signal; generate one or more video overlay graphics using data obtained over the network connection; combine the one or more video overlay graphics with the input video signal to generate a modified version of the input video signal; and provide the modified version of the input video signal to the output video interface.

In some aspects, the network connection may be an Internet connection, and the overlay can include data obtained from the Internet connection. In some embodiments, the original video received at the input video interface may be resized in the modified version of the input video signal, and the resized video may be displayed adjacent to the overlay in a separate graphical panel. In some embodiments, the overlay graphics can include data obtained from a security system at the same premises (e.g., a home security system), as well as video obtained from a local camera communicating with the adapter device.

In some embodiments, the camera may be used for facial recognition and user profile login, and can be used to engage in video chats with friends of a user. The video chats may include sharing of content, such as picture images stored on a user's thumbdrive, which may be attached to the adapter device.

In some embodiments, video passthrough handling may be conducted to allow the same input video signal to appear at the output video interface, but when an overlay is needed, such as when an incoming video call invitation is received, the adapter can resize the original input image and generate an overlay using incoming images associated with the video call.

In some embodiments, a user may employ a secondary device, such as a smartphone or tablet computer, to view a copied version of the modified version of the input signal, and use the secondary device to manipulate and rearrange the various graphics and panels appearing in the modified version of the input signal. Such manipulation may also be performed using in-air gestures, such as hand motions, detected by the camera. For example, the space in front of a user may be divided into different regions corresponding to different graphical panels, and the user may position hands in the regions and make predefined gestures to enter a command for the region's panel.

The adapter device (which may be implemented, for example, by hardware and/or software) may be installed to upgrade the interactive capabilities of an existing video output device. The installation may involve identifying the original output device's output line, disconnecting it from the display device and connecting it to a corresponding input on the adapter device instead, and connecting a second video line between an output interface on the adapter and the video input interface on the display device to which the original output line was connected. The adapter can then switch between a passthrough mode in which an original incoming video signal is simply passed through to its output, and an overlay mode in which one or more graphical overlay objects are added to the video signal before sending it to the output. The camera may be installed as well, and may be used as described above to provide the various features described above.

BRIEF DESCRIPTION OF THE DRAWINGS

FIGS. 5a-10 illustrate example display screens.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
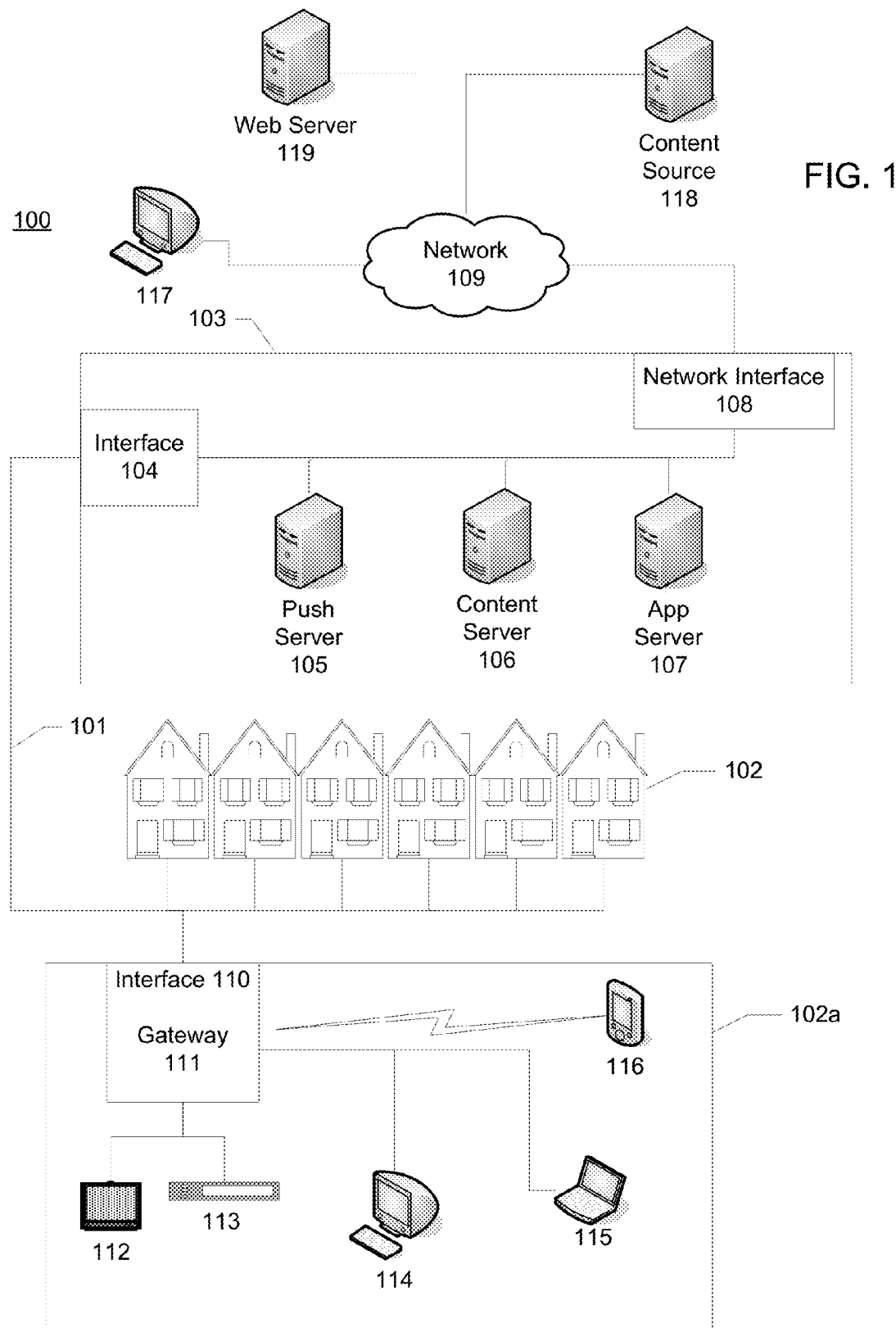
FIG. 1 illustrates an example information distribution network on which many of the various features described herein may be implemented.

FIG. 1 illustrates an example information distribution network 100 on which many of the various features described herein may be implemented. Network 100 may be any type of information distribution network, such as satellite, telephone, cellular, wireless, etc. One example may be a wireless network, an optical fiber network, a coaxial cable network and/or a hybrid fiber/coax (HFC) distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office 103 (e.g., a headend, a processing facility, etc.). The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include a termination system (TS) 104, such as a cable modem termination system (CMTS) in an example of an HFC-type network, which may be a computing device configured to manage communications between devices on the network of links 101 and backend devices such as servers 105-107 (to be discussed further below). In the example of an HFC-type network, the MTS may be as specified in a standard, such as the Data Over Cable Service Interface Specification (DOCSIS) standard, published by Cable Television Laboratories, Inc. (a.k.a. CableLabs), or it may be a similar or modified device instead. The MTS may be configured to place data on one or more downstream frequencies to be received by modems at the various premises 102, and to receive upstream communications from those modems on one or more upstream frequencies. The local office 103 may also include one or more network interfaces 108, which can permit the local office 103 to communicate with various other external networks 109. These networks 109 may include, for example, Internet Protocol (IP) networks Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the local office 103 may include a variety of servers 105-107 that may be configured to perform various functions. For example, the central office 103 may include a push notification server 105. The push notification server 105 may generate push notifications to deliver data and/or commands to the various premises 102 in the network (or more specifically, to the devices in the premises 102 that are configured to detect such notifications). The central office 103 may also include a content server 106. The content server 106 may be one or more computing devices that are configured to provide content to users in the homes. This content may be, for example, video on demand movies, television programs, songs, services, information, text listings, etc. In some embodiments, the content server 106 may include software to validate (or initiate the validation of) user identities and entitlements, locate and retrieve (or initiate the locating and retrieval of) requested content, encrypt the content, and initiate delivery (e.g., streaming, transmitting via a series of content fragments) of the content to the requesting user and/or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream and/or content item being transmitted to the premises 102.

An example premises 102a may include an interface 110 (such as a modem, or another receiver and/or transmitter device suitable for a particular network), which may include transmitters and receivers used to communicate on the links 101 and with the local office 103. The interface 110 may be, for example, a coaxial cable modem (for coaxial cable lines 101), a fiber interface node (for fiber optic lines 101), or any other desired modem device. The interface 110 may be connected to, or be a part of, a gateway interface device 111. The gateway interface device 111 may be a computing device that communicates with the interface 110 to allow one or more other devices in the home to communicate with the local office 103 and other devices beyond the local office. The gateway 111 may be a set-top box (STB), digital video recorder (DVR), computer server, or any other desired computing device. The gateway 111 may also include (not shown) local network interfaces to provide communication signals to other devices in the home (e.g., user devices), such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces may include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
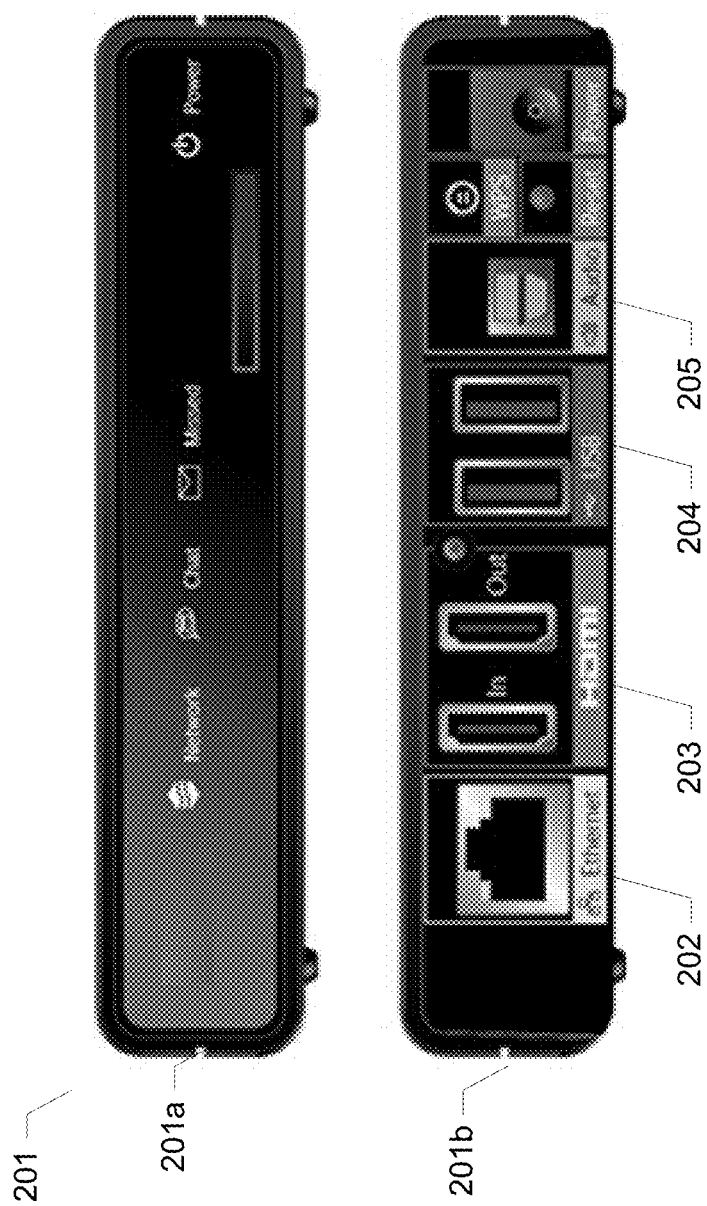
FIG. 2 illustrates an example physical appearance of a video adapter.

FIG. 2 illustrates an example physical appearance of a video adapter 201. The adapter 201 may include a variety of indicators on the front panel 201a, such as light emitting diodes (LEDs) to indicate network connectivity, chat message availability, missed incoming messages, power, volume, or any other desired visual indication of operation. The rear panel 201b may include a variety of ports and interfaces to communicate with external systems and devices. For example, the rear panel 201b may include an Ethernet interface 202 configured to communicate on an Ethernet network device. For example, the Ethernet interface may be coupled to a corresponding port on a gateway device 111.

The adapter 201 may include one or more pairs of signal passthrough connections 203. For example, the connections 203 may include a pair of input and output HDMI (High Definition Multimedia Interface) ports. In operation, the signal arriving on the input port can include a video signal (e.g., the video portion of an HDMI signal), and the components within the adapter can process this signal and add one or more overlay video (and/or audio) signals, and output an output signal that is in the same format as the input (e.g., another HDMI signal), but containing the overlaid signals. The overlaid video and/or audio signals can be used to enhance a user's viewing experience, as described in greater detail below. Although HDMI ports are used as examples, any desired type of signal line can be used. For example, video composite, component, digital video interface (DVI), coaxial cable, wireless, Ethernet, USB, etc. may be used.

The adapter 201 may include one or more ports 204 for local devices, such as Universal Serial Bus (USB) ports that can be used to communicate with any number of desired local (or remote) devices. The adapter 201 may also include one or more audio output (or input) ports 205. For example, a digital audio output port can provide an optical output signal containing digital audio.

Figure 3:
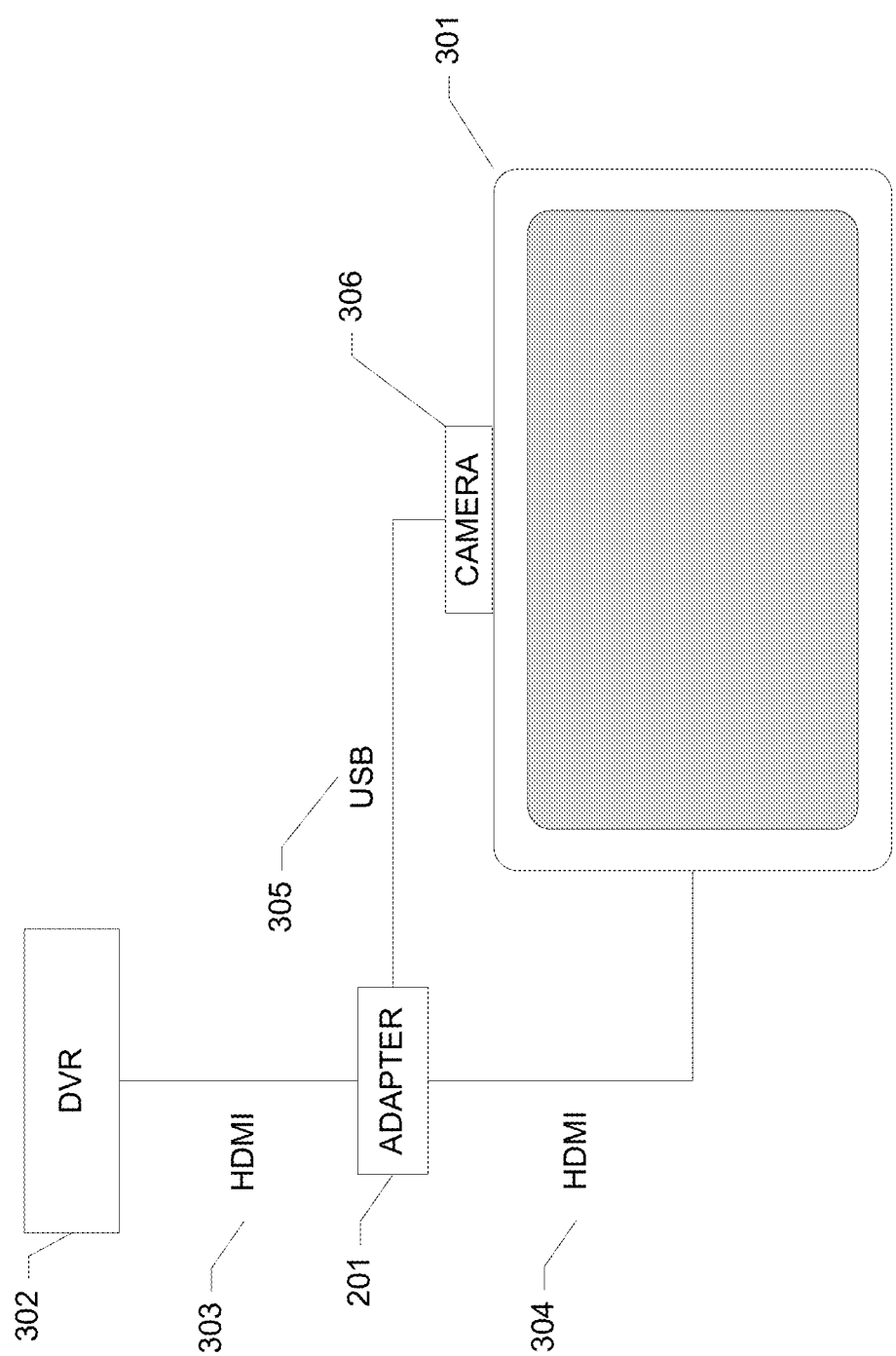
FIG. 3 illustrates an example configuration using video adapter.

FIG. 3 illustrates an example configuration using video adapter 201. In the example configuration, a user may have a video device 301, such as a television or video monitor, that is used to view video content. The video content may come from a video source, such as a digital video recorder (DVR) 302. The video source 302 may use a video connection 303, such as an HDMI cable, to provide a video output signal (audio may also be included in any reference to video signals herein). Without the adapter, this video connection may be plugged directly into an HDMI input port on the back of the television 301. However, upon installation of the video adapter, the video connection 303 may be inserted into the "input" port 304 on the adapter, while another video connection 304, in the same format as the input (e.g., in HDMI format) can supply the modified video signal to the television 301 for display. In this pass-through manner, the adapter 201 can be installed in-line in the video line that the user is already using to receive video signals on the television 301, and installation can be easily done.

The adapter 201, however, may also be connected to other devices. For example, the adapter may be connected (e.g., via a USB line 204) to a camera 306. The camera 306 may capture moving and/or still video images, and can further process them to perform gesture recognition, facial recognition, bar code or symbol recognition, or any other desired type of camera input.

Another example may be a control line used to control other devices. For example, the adapter 201 may be connected to an infrared emitting diode (not shown), which can then be used to transmit infrared commands to simulate those sent from a typical infrared remote control. In this way, the adapter can be configured to control the operation of devices such as the DVR 302 and/or the television 301. While infrared is the example described above, other forms of remote control (e.g., radio frequency, wired) may also be used.

As another example, the adapter may be connected to a network, such as a home's wireless network, an Ethernet network, a MoCA (Multimedia over Coax Alliance) network, etc., and may send and receive data using such a network to external networks, such as the Internet. The data received from these networks may be used to manipulate the incoming video signal, resulting in an output video signal that can include the manipulated incoming signal along with added details, such as a video overlay.

The example in FIG. 3 is just an example, and the various components may be combined/subdivided as desired. For example, the camera 306 may be included in a common chassis as the adapter 201.

Figure 4:
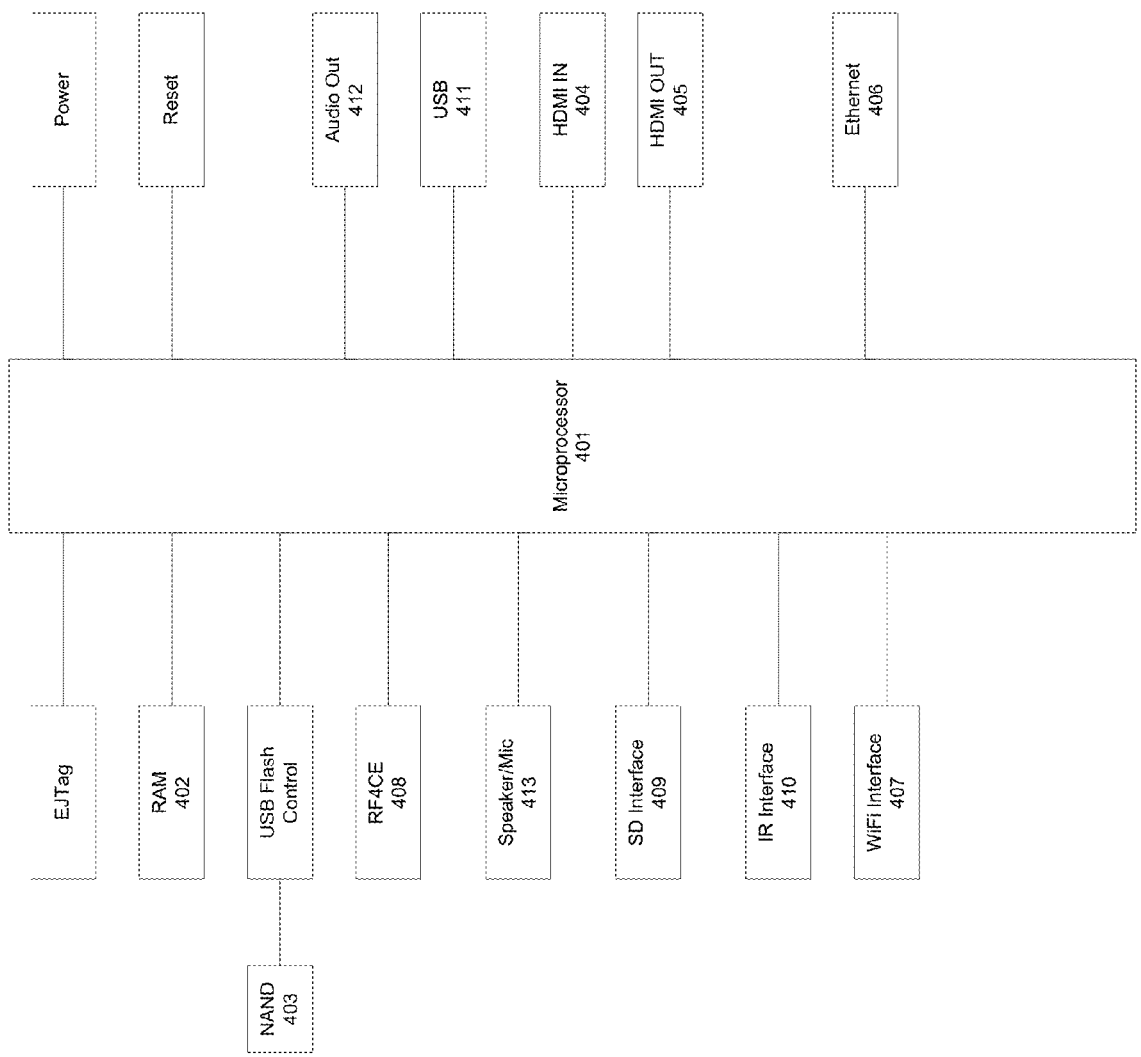
FIG. 4 illustrates an example hardware schematic for the video adapter of FIG. 2, showing more detail.

FIG. 4 illustrates an example hardware schematic for the adapter 201, showing more detail. At its heart, the adapter 201 may be or otherwise include a computing device, and may contain one or more processors 401 that can execute instructions stored in a computer-readable memory or storage device, such as a random access memory (RAM) 402 and/or flash 403, to perform any of the functions described herein.

As noted above, the adapter 201 may include an HDMI (or other video signal) input 404 and output 405, allowing passthrough of the HDMI signal from input 404 to output 405, but with added overlay content (if desired), as will be described further below. The passthrough circuitry may include an HDMI and H.264 SVC decoder and encoder.

The adapter 201 may include a variety of network interfaces, to send and receive data that can affect the overlay content and use of the input 404 signal. For example, the adapter 201 may include an Ethernet interface 406, a Wi-Fi interface 407 (e.g., IEEE 802.11), a Zigbee/RF4CE interface 408, and any other desired type of network interface (e.g., a Multimedia over Coaxial Alliance—MoCA—interface). In some embodiments, these interfaces (e.g., the Wi-Fi interface 407) may serve as wireless range extenders, extending the range of coverage for a particular network type.

The adapter 201 may include removable computer-readable storage, such as via a secure digital (SD) interface 409, which can also store executable instructions for the processor 401.

The adapter 201 may include an infrared input and/or output interface 410, which can allow the adapter 201 to receive remote control commands, as well as issue infrared remote control commands using an infrared light emitting diode. Similarly, the interface 410 can include radio frequency (RF) circuitry to communicate with RF-based remote controls.

The adapter 201 may include one or more additional local device interfaces, such as USB ports 411, which can be used to communicate with any desired type of local device, such as camera 306. The camera 306 may include its own processing and storage capability to recognize faces and/or gestures (e.g. for use in facial detection and user profile sign-in), process images to improve quality, perform voice recognition using built-in microphones, etc. Alternatively, such functionality may be provided by the processor 401 in the video adapter 201, or even remotely at, for example, an app server 107. In some embodiments, the camera 306 may include a privacy shutter, which can physically cover up one or more lenses when the camera is not being used, and a front panel indicator (e.g., an LED) can indicate that the shutter is closed, to give users some comfort in knowing that they are not being secretly video recorded.

For processing audio, the adapter 201 may include an audio line out 412, which can be a digital optical audio output. The adapter 201 may also include a speaker and/or microphone 413, allowing the device to locally transmit and/or receive audible sounds in the room. In some embodiments, the processor 401 may be configured to perform text-to-speech conversion to audibly announce the contents of incoming text messages and pop-up alerts. Similarly, the processor 401 may be configured to respond to voice commands.

FIGS. 5a&b illustrate example display screens. FIG. 5a illustrates an example video screen image 500 that may be supplied by a video source, such as DVR 302, on a video line such as HDMI line 303. The image 500 may be passed in to the adapter 201, and upon emergence the output line 304 may carry a modified version of the original source video, having screen image as shown in FIG. 5b, which includes the original screen 500 with an overlay image 501. The overlay image 501 can be of any desired type. For example, the image 501 can contain Internet content, such as an Internet page or a streaming Internet video. The overlay image 501 can contain video signals captured, for example, by an attached camera 306, or delivered locally to the adapter 201 via Ethernet, Wi-Fi, etc. from a user's device such as a smartphone, tablet computer, desktop computer, etc. In some embodiments, the overlay image 501 can swap places with the primary image 500, and occupy the larger portion of the screen while the original screen image appears in the corner. This may be useful, for example, to allow a user to surf an Internet page on the larger area, while still keeping an eye on the happenings of a television program in the overlay area.

FIG. 6a illustrates another example, in which the user has a primary viewing area of the screen 600, and three separate sub-panels 601 open on top of the primary one. These areas can be populated with any combination of the original input signal from the video source (e.g., from the DVR) and signals received from other sources, such as the Internet, local tablet computers, etc. So, for example, the FIG. 6a image may have an Internet browser in the main screen 600, the video signal from the DVR in one of the sub-panels 601, and two other streaming Internet videos in the other sub-panels. As another example, a ringing of the doorbell can cause activation of a front door security camera (not shown), which can then deliver a video stream to the adapter 201, which can then overlay a sub-panel 601 so the user can see who is at the door without even getting up from the couch.

The user may receive a request 602 to conduct a video chat or video call. Users of the adapter may initiate and send invitations to view content and engage in chats by, for example, accessing a social connection application in memory (e.g., in RAM), and request that the application send a message to an identified contact of the user. Note that the social connection application can interact with any desired source of contact, such as sending an Internet request to a server that runs a social networking website, identifying the user and requesting the user's friend list. In this way, the adapter 201 can interact with a variety of different address books for the user. In some embodiments, the adapter 201 can query a presence-aware application to identify friends who are watching a show (e.g., if that presence-aware application included a login feature, facial recognition, or other mechanism for determining who is actually in the room), and then use the address book from a different social network application to request IP addresses for the friends who are watching the show, in order to deliver a chat invite to those friends. As an example, the adapter 201 may use a user's SKYPE™ buddy list to identify people who are online, and then use that list to request addressing information from a PLAXO™ database to deliver messages and invitations.

The user may see the chat request 602, and may accept it by pressing a button on a remote, entering a gesture involving hands/arms/head, speaking "yes" out loud, or any other desired input mechanism.

Upon initiating the chat, the display may be rearranged and the panels may be rescaled. FIG. 6b illustrates an example in which adapter 201 is used to carry an audio and/or textual chat, and the panels may be rearranged. One or more of the panels (e.g., a sub-panel 601) may be changed to display a video image from one of the participants to the chat. A separate chat window 603 may appear, and may be used to enter and receive chat messages. The user may use any desired device, such as a laptop's keyboard, a keyboard on an RF remote control of the adapter 201, or a tablet connected via Wi-Fi to communicate with the adapter 201 and enter text. Although a text chat is discussed as an example, the chat may be a video call, in which case the microphone and speaker 413 may be used to conduct the discussion, instead of (or in addition to) the text entry panels shown.

The user may further rearrange the panels, such as that illustrated in FIG. 7. The repositioning can be controlled using camera-detected gestures. For example, the user may hold a hand in a predetermined position to sift or page through the various onscreen elements (which may be thought of as "layers" in the image), and may highlight one to bring it forward, move it to a different location, identify it as a target for future keyboard inputs, close it, etc.

The panels may be used to conduct a social media viewing experience. For example, a user can connect an SD memory card, tablet computer, smartphone, digital hand-held camera, or other device to the adapter 201, and begin a joint picture-viewing session with a chat friend. As illustrate in FIG. 8, the user may be given a primary panel 800 in which a picture is displayed, and the image for this panel 800 may be taken from the connected picture device. Overlaid on that image may be an image 801 from the user's chat camera 306, and an image 802 from a chat friend's camera, as well as navigation controls 803 for paging through the displayed pictures.

The user's adapter 201 may transmit the photo images as a stream to the friend's corresponding adapter 201, and may transmit video images from the user's camera 306 in a different stream. The friend's corresponding adapter 201 may receive, assemble and rearrange the various panels as the friend desires.

In some embodiments, the participants may be given additional command options. For example, the chatting friend may be given an option to enter a command (e.g., by speaking a voice command, or selecting an onscreen icon) to copy an underlying photo to that friend's own storage, such as the friend's own SD card, a cloud storage, or another computing device communicating with the friend's adapter 201. In this way, parents of a newborn can share photographs of the child with grandparents, and can engage in a joint viewing experience with voice chat to discuss the images, and the grandparents may have the option to automatically tag pictures for copying and/or local storage to their own computing devices. In some embodiments, the various photographs may be uploaded to a server, such as app server 107, and the app server 107 may process the photographs to generate a video file (e.g., an MPEG video file) that can then be made available to users for download and/or streaming on demand.

Similarly, since additional sub-panels may be displayed, the chat participants may also add one or more additional sub-panels to their display, without alerting the other chat participant. So, for example, during the baby picture viewing with the grandparents, another user can have an overlay of local DVR content appear onscreen, and can watch a television program while also chatting with the grandparents. Of course, the grandparents can also do the same.

A pop-up alert, such as the chat invite 602, can be used to alert the user of a variety of things, in addition to an incoming chat or call request. For example, a similar message may be displayed when the doorbell rings (as discussed above), when a breaking news story occurs, or when an incoming telephone call is received. Any desired news feed or IP stream can serve as a trigger to causing a pop-up alert to appear.

The joint viewing session of FIG. 8 can be used for more than simply viewing pictures. For example, multiple friends may join a common chat to watch a particular movie, and their various adapters 201 may coordinate synchronization of the different streams so that latency and data traffic delay can be accounted for, so that the users all see the same content at the same time in a coordinated viewing experience. Each participant's video device, such as a DVR, may initially receive a stream of the underlying movie itself, and the various adapters 201 may be responsible for gathering synchronization information, and for sending pause/playback commands to their respective DVRs to cause the synchronized playback.

In such a joint viewing experience, users can press a button to tag certain portions of the program and provide their own written comments thereon, or to tag them for inclusion in a version of the program that contains only the portions tagged by friends during the viewing.

In some embodiments, a user may enter a command to request that the chat session be recorded on the adapter 201 or another device (e.g., a separate tablet computer or desktop computer networked with the adapter 201). In response to such a command, the adapter 201 may initiate a stream of its output video to the target recording device. For example, a user can have a virtual visit with a doctor as a chat, and can have the examination session recorded for later inclusion in the doctor's files. The chat can also include additional sub-panel overlays 601 containing the patient's vital statistics, detected measurements, or any other data that is relevant to the visit. That other data may be retrieved, for example, via an Internet connection between the adapter 201 and an Internet server.

In some embodiments, when a user is engaged in a voice chat, the adapter 201 may be configured to detect the audio of the program being watched, and filter out that audio from audio detected by the microphone 413 and sent to the other users in the chat. In this manner, the other user need not receive or hear the audio from the first user's television.

Figure 9:
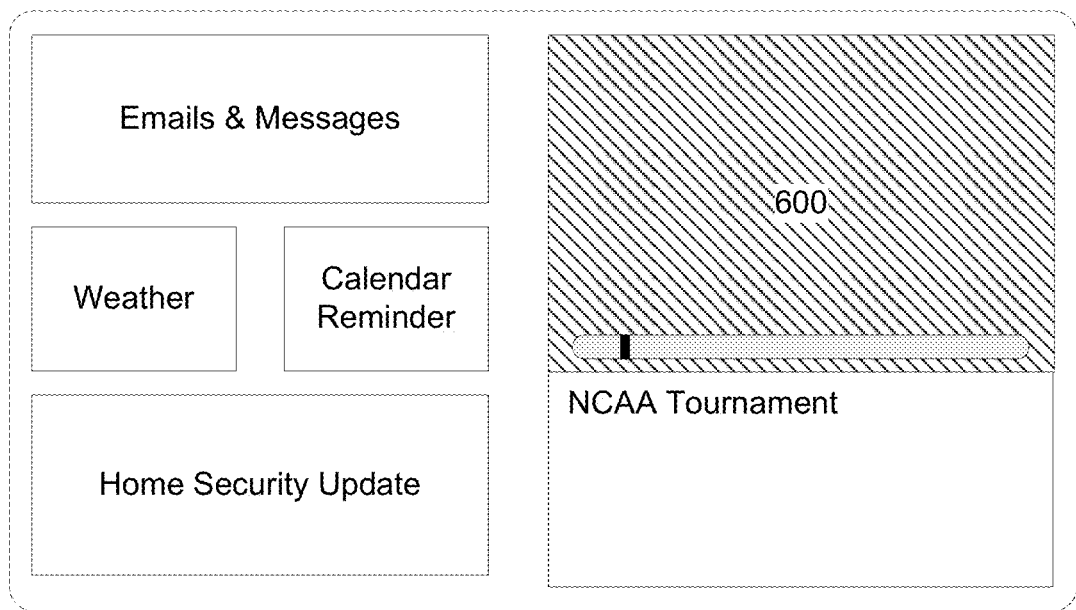

FIG. 9 illustrates an example default screen that may be displayed for the user. In it, the adapter 201 may take the original video image 600 from the DVR, and resize/overlay it to generate additional user-selectable elements for other applications, such as an e-mail application, weather application, calendar application, home security application, program description application, etc. The layout shown in FIG. 9 may be a default layout, and it may be customized by the user.

In some embodiments, the user may use a secondary device, such as a tablet computer, to control the overlaying of images by the adapters 201. As illustrated in FIG. 10, the user's television may display a first image 1001, having an arrangement of panels similar to that shown in FIG. 9. This image may be generated by the adapter 201, which resizes the original input image and add the other panels for the other applications, and the adapter 201 may also transmit an alternate version of this image to the user's tablet 1002. The alternate version may be identical to the original, or it may be smaller in dimension and/or resolution, omitting some graphical detail found in the original to simplify transmission and reduce latency. For example, the alternate screen on tablet 1002 may simply have outlines for the different panels, without labeling or graphics found in the original image on the television 1001. The user may use the input capabilities of the tablet 1002 (e.g., a touch screen) to rearrange and/or resize the panels appearing on the tablet's 1002 display, and the corresponding change in position and/or size can be replicated in the image shown on the television 1001.

As noted above, in some embodiments, user gestures and/or movements may be detected by the camera 306, and used as control inputs to the adapter 201. The gestures may allow a variety of functionality. For example, the 3-D space in front of a user may be detected by the camera. For example, the camera may determine that the user is 10.0 feet away from the television. That space may be allocated to different panels appearing on the display, and gestures inputted in the allocated space may be directed to the corresponding panel or its supporting application. So, for example, if the FIG. 6a display is shown on the user's television, the adapter 201 may determine that gestures made with 0.0-2.0 feet in front of the television will correspond to the topmost sub-panel 601; gestures made with 2.0-3.0 feet will correspond to the middle sub-panel 601; and gestures made within 3.0-4.0 feet will correspond to the lowest sub-panel 601. A predefined gesture may have a meaning (e.g., a certain hand motion to signify "yes"), and when the gesture is made by the user within the predefined distance range from the television, the adapters 201 may send the detected gesture or command to the corresponding application. So, for example, a "yes" gesture made 3.2 feet from the television may be sent to the lowest sub-panel 601.

While the above example divides the space according to distance from the television, other divisions are possible. For example, a 2-D planar space in front of the user (and parallel to the television) may be mapped to the different regions of the screen, and gestures made in the mapped region in front of the user can be sent to the application whose image appears in the corresponding region on the television.

Figure 11A:
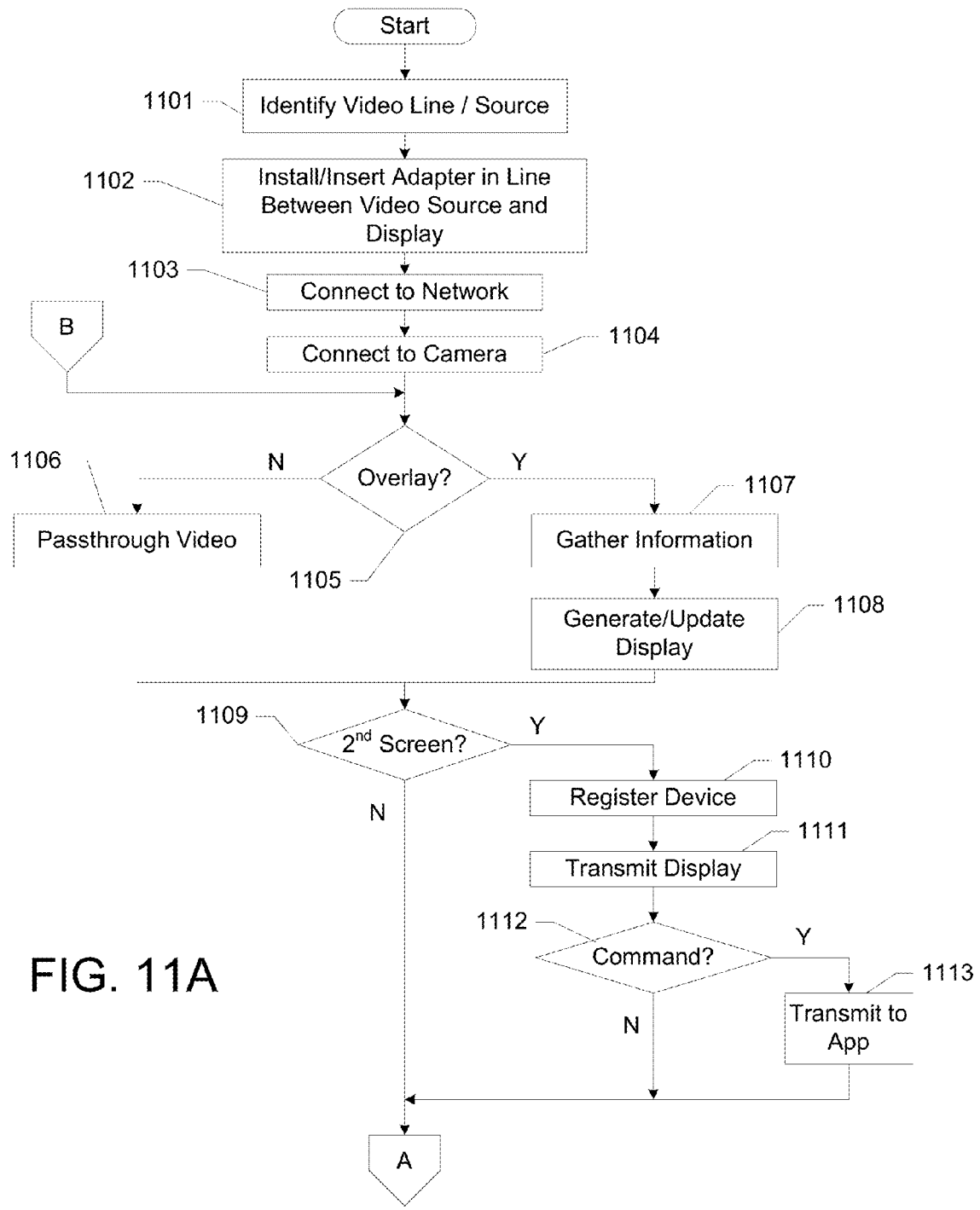
FIGS. 11a&b illustrate an example method of installing and using the video adapter.
Figure 11B:
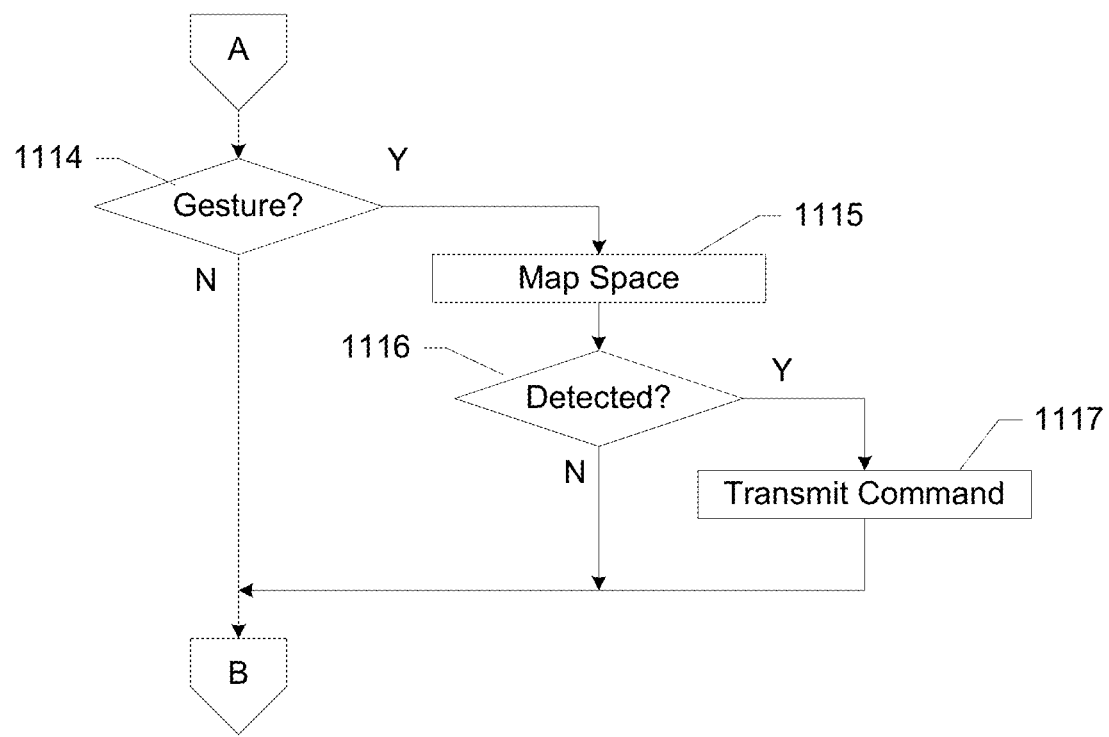

FIGS. 11a&b illustrate an example method of installing and using the video adapter device described herein. In step 1101, an existing video line may be identified by the user, homeowner, service technician, or other person handling the installation. As noted above, the existing video line may be an HDMI data cable connected between a video source (e.g., a DVR) and a video display (e.g., the user's High Definition Television (HDTV) set). In step 1102, the user may insert the video adapter in the video line between the video source and the display. This may be accomplished, for example, by disconnecting the existing video line from the display's input terminal (not shown), and connecting it to the adapter's video input interface 404, and adding a new video line between the adapter's video output interface 405 and the display's input terminal. As an alternative, the new line may be used between the video source and the video adapter, and the existing video line may be used between the video adapter and the display.

In step 1103, the video adapter may be connected to a local data network, such as a wi-fi network, an Ethernet network, a MoCA network, or any other data network available at the premises 102a. This connection may be performed by the adapter automatically upon startup (e.g., it may automatically join an Ethernet network upon connection and powerup), or it may be performed manually by the user (e.g., the user may activate a wi-fi radio and enter login information to have the adapter join the network). The connection may be local, and may connect to a gateway 111 or interface 110 to communicate with a further external network 101. In alternative embodiments, the adapter may include its own interface 110 or connection to an external network, bypassing the gateway 111.

In step 1101, the adapter may connect to local camera 306. This may occur automatically upon the camera 306 being plugged in, for example, to the adapter's USB port 411.

In step 1105, the adapter may determine whether any overlay is needed by any software application running on the video adapter (or remotely and communicatively connected to the video adapter). The overlays may be generated by a variety of applications, such as the voice chat, home security and weather applications described above and depicted in the figures. If no overlays are needed, then in step 1106, the video adapter may simply conduct passthrough handling of the incoming video signal received at the input interface 404 from the video source. The passthrough handling may be as simple as allowing the original incoming video signals to pass straight through the adapter to arrive at the adapter's output interface 405, as if the adapter were a simple video line.

If an overlay is needed in step 1105, then in step 1107, the adapter may perform steps to gather information necessary for the display. This gathering of information can vary depending on the type of overlay needed. In some embodiments, a software application on the video adapter (e.g., a video chat application) may gather information for the overlay by sending and receiving Internet data over the data network. For example, the video chat application may open an Internet streaming session with an external video chat server (e.g., server 107), which may gather video from other participant(s) in the chat and make them available for streaming. The streaming content may be in a video format (e.g., MPEG2), which the video adapter can receive, adjust as needed (e.g., resizing) and decode for display. Alternatively, the content from the external server may simply be data in another format (e.g., a database, data packets, etc.), which the adapter (using the corresponding software application) may use to generate the overlay. For example, a weather application might simply receive a few packets of data from the external server, indicating the current weather conditions, and the weather application on the adapter may be responsible for generating the video overlay screen depicting the weather conditions, graphical images of the sun, etc.

In some embodiments, the overlay can be generated by the adapter without need for any data from an external server. For example, a home thermostat control application may reside on the video adapter's memory, and its various displays may be generated through use of the data stored in the memory (and the thermostat sensors in the premises).

In step 1108, the necessary overlay(s) is generated by the video adapter. This generation may include resizing and/or rearranging the original input video signal from the video source and/or the overlay(s), and preparing an output video signal for the output interface 405. This output video signal may be in the same format (e.g., HDMI) as the input video signal.

The discussion above uses visual overlays as an example, but other types of overlays may be generated as well. For example, an application may generate an audio overlay to add an audio signal to the audio of the original input signal. The video line may carry audio signals as well (e.g., an HDMI cable carries audio and video), or audio lines may be handled akin to the video lines discussed above.

In step 1109, the video adapter may determine whether second-screen operation is active. Second-screen operation may involve the user employing another display device, such as a tablet computer or smartphone, in conjunction with the primary screen shown on the display. An example of this is discussed above with respect to FIG. 10, in which the user employs a secondary device 1002 to control and interact with the overlays on the display. Second-screen operation may be requested in a variety of ways. For example, the user may press a button on a television or DVR remote control, or on the adapter itself.

If second-screen operation is active, then in step 1110, the adapter may register the one or more second screen devices that will be used. The registration may include informing the video adapter of the address and device type of the second screen device (e.g., its IP or MAC address, and an identification of the device's capabilities, model number, etc.). This registration may be omitted, of course, if the second screen device is already registered for an active second screen operation.

In step 1111, the video adapter may then transmit the corresponding second screen display data to the second screen device. This may be done, for example, using local wi-fi communication if both are connected to the same wireless network. If they are on different networks (e.g., the video adapter is wired through Ethernet and the second screen tablet computer is connected to a wireless network), then any desired network communication method may be used to transmit the data. For example, the video adapter may transmit the data to an intermediate router, to which the second screen device is also communicatively connected.

In step 1112, the video adapter may determine whether a command has been received from the second screen device. For example, the user of the second screen device may view the overlays on the second screen, and may enter a command (e.g., by tapping or dragging on a tablet's touch surface) to open, close, resize and/or rearrange the various overlays on the main display by interacting with the reduced-resolution versions displayed on the second screen. If an input command has been received, then in step 1113, the second screen device may transmit the command to the video adapter and addressed to the corresponding application, and the video adapter may then relay the command to the application for further processing. As noted above, this application may be local to the video adapter, or it may reside on an external server.

After sending any detected command, or if no second screen operation is active, the process may proceed to step 1114. In step 1114, the video adapter may determine whether gesture-based interaction is active. This may occur, for example, if a camera 306 has been installed, and has been configured to recognize gesture-based commands. If gesture-based interaction is active, then in step 1115, the video adapter may use the camera to map the available space in front of the camera and/or television. As discussed above, different areas of the space (e.g., 0-2 feet in front of the display, the upper-left corner of the 2-D plane in front of the user, etc.) may be designed by the video adapter as corresponding to different regions of the display, or different layers of overlays.

In step 1116, the adapter (or the camera 306) may check to determine whether a gesture has been detected. This may be accomplished using any desired gesture detection software and/or hardware. The gestures may be any type of gesture that can be detected. For example, a hand gesture such as a thumbs up or thumbs down, or an arm waving gesture, may be used to signal different commands.

If a gesture is detected, then in step 1117, the corresponding command for the gesture may be supplied to the video adapter, which may then determine which command and application correspond with the gesture. The video adapter can then forward the command to the appropriate application. The involvement of the camera and video adapter can vary. For example, in some embodiments the camera and video adapter may simply capture a still or moving image, and deliver the image to a remote server for processing to detect gestures. Alternatively, the camera 306 itself may include processing (similar to the processor and memory of the adapter) to identify gestures and match the gesture to the corresponding application based on, for example, the space mapping described above. In that example, the command sent in step 117 may be just a command, similar to that sent in step 1113, or to a command sent from a remote control.

If no gesture is detected, or if gesture detection is inactive, the process may return to step 1105 to repeat the process.

The various features described above may be carried out by the video adapter 201, whose processor 401 may execute software application instructions stored in a memory (e.g., RAM 402, external memory, etc.) to provide, perform, and/or control the features. These various applications may be made available for purchase and/or download via a computing device, such as app server 107, which may download additional applications to the adapter 201 upon user request. The additional applications may provide any number of additional sub-panels 601 and interactive features. In some embodiments, the software may reside partially (or totally) at the app server 107, such that the video adapter 201 may need only be a remote client terminal or "dumb box" that conveys user inputs and renders displays supplied to it from an external source, such as the app server 107.

In some embodiments, the video adapter 201 may include an application to assist in coordinating the automatic synchronization of data across various devices. For example, when portable devices connect with a wireless router within the home, the devices may register with an application on the video adapter 201, and may exchange information identifying new data that should be updated. The new data can be any data (e.g., new photographs from a smartphone's camera) that was newly generated since a previous synchronization, and may be on the connecting portable device or any other device that has previously connected to the wireless network. The devices sharing data need not all be portable. For example, devices like a user's DVR, desktop computer, home security system, etc. may also participate and share their data.

In some embodiments, various security cameras may be added to a user's premises security system. Each camera may communicate with the adapter 201 to provide the adapter 201 with video images and other data captured by the camera. These various images (and audio, if desired) may be included in the display sent to the user's display device. For example, the FIG. 9 screen's Home Security Update may include one or more video images from a camera in the home. So in this embodiment, a user watching television may enter a command (e.g., a predefined gesture or remote control button) to cause a particular camera's video to appear atop or beside the television video signal. Such a video can automatically appear in response to a security incident. For example, a motion detector outside can automatically send a video image from an outside camera in response to detecting motion, and have that video overlaid on the video being watching by the user.

In some embodiments, an application may be used for thermostat control. The user may view an overlay containing home thermostat information, such as current temperature and settings. The user can interact with this app (using, for example, a remote control, connected smartphone, or in-air body gestures detected by camera) to view and change home thermostat settings.

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

The descriptions above are merely example embodiments of various concepts. They may be rearranged/divided/combined as desired, and one or more components or steps may be added or removed without departing from the spirit of the present disclosure. The scope of this patent should only be determined by the claims that follow.

What is claimed is:

1. A method comprising:
    sending, by a computing device and to a display device, a signal comprising at least a first and a second graphical panel associated with at least a first and second application, respectively;
    defining a three-dimensional space in front of a user and the display device, wherein the three-dimensional space is divided into a plurality of sub-spaces comprising at least a first subspace and a second subspace, wherein the first subspace is closer to the display device than the second subspace;
    associating the first and second applications to the first subspace and the second subspace, respectively;
    detecting a gesture made by the user in the first subspace, wherein the gesture is associated with a pre-defined command; and
    sending the pre-defined command associated with the gesture to the first application corresponding to the first subspace in which the gesture was detected.

2. The method of claim 1, further comprising:
    receiving video images from a camera; and
    generating one or more overlay video images within the first graphical panel.

3. The method of claim 1, wherein the graphical panels sent by the computing device to the display device comprise:
    the first graphical panel comprising a resized input video;
    the second graphical panel comprising local video signals obtained from a local camera;
    a third graphical panel comprising data obtained from a local security system; and
    a fourth graphical panel comprising data obtained from an external data network.

4. The method of claim 1, further comprising using the computing device to conduct a joint content viewing session with a remote user, wherein the joint content viewing session comprises shared viewing of image content stored on a memory device connected to a first computing device of one participant to the joint content viewing session.

5. The method of claim 1, further comprising:
    receiving, by the computing device, an input video and one or more video overlay graphics; and
    combining, by the computing device, the one or more video overlay graphics with the input video to generate the signal, wherein the signal comprises the input video and the one or more video overlay graphics in separate graphical panels.

6. The method of claim 1 further comprising:
    manipulating the first graphical panel associated with the first application in response to the pre-defined command.

7. The method of claim 1, further comprising:
    sending, by the computing device, an alternate display signal to a secondary computing device, wherein the alternate display signal comprises outlines of the first and second graphical panels and omits interior details of the first and second graphical panels; and displaying the alternate display signal on the secondary computing device and using rearrangement commands inputted to the secondary computing device to rearrange the first and second graphical panels on the display device.

8. The method of claim 1, wherein the computing device receives premises security system data from a premises security system located at a premises of the computing device, and wherein the pre-defined command causes the first graphical panel to display the premises security system data.

9. At least one non-transitory computer-readable medium having computer-executable instructions stored thereon that, when executed, cause at least one processor to:
    send, by a computing device and to a display device, a signal comprising at least a first and a second graphical panel associated with at least a first and second application, respectively;
    define a three-dimensional space in front of a user and the display device, wherein the three-dimensional space is divided into a plurality of subspaces comprising at least a first subspace and a second subspace, wherein the first subspace is closer to the display device than the second subspace;

associate the first and second applications to the first subspace and the second subspace, respectively;

detect a gesture made by the user in the first subspace, wherein the gesture is associated with a pre-defined command; and send the pre-defined command associated with the gesture to the first application corresponding to the first subspace in which the gesture was detected.

10. The at least one non-transitory computer-readable medium of claim 9, having additional computer-executable instructions stored thereon that, when executed, further cause the at least one processor to:

manipulate the first graphical panel associated with the first application in response to the pre-defined command.

11. The at least one non-transitory computer-readable medium of claim 9, having additional computer-executable instructions stored thereon that, when executed, further cause the at least one processor to:

detect a second gesture made by the user in the second subspace, wherein the second gesture is associated with a second pre-defined command;

send the second pre-defined command associated with the second gesture to the second application corresponding to the second subspace in which the second gesture was detected; and manipulate the second graphical panel associated with the second application in response to the second pre-defined command.

12. The at least one non-transitory computer-readable medium of claim 9, having additional computer-executable instructions stored thereon that, when executed, further cause the at least one processor to:

send, by the computing device, an alternate display signal to a secondary computing device, wherein the alternate display signal comprises outlines of the first and second graphical panels and omits interior details of the first and second graphical panels; and display the alternate display signal on the secondary computing device and use rearrangement commands inputted to the secondary computing device to rearrange the first and second graphical panels on the display device.

13. A computing device, configured to:

send, by the computing device and to a display device, a signal comprising at least a first and a second graphical panel associated with at least a first and second application, respectively;

define a three-dimensional space in front of a user and the display device, wherein the three-dimensional space is divided into a plurality of subspaces comprising at least a first subspace and a second subspace, wherein the first subspace is closer to the display device than the second subspace;

associate the first and second applications to the first subspace and the second subspace, respectively;

detect a gesture made by the user in the first subspace, wherein the gesture is associated with a pre-defined command; and send the pre-defined command associated with the gesture to the first application corresponding to the first subspace in which the gesture was detected.

14. The computing device of claim 13, further configured to:

manipulate the first graphical panel associated with the first application in response to the pre-defined command.

15. The computing device of claim 13, further configured to:

detect a second gesture made by the user in the second subspace, wherein the second gesture is associated with a second pre-defined command;

send the second pre-defined command associated with the second gesture to the second application corresponding to the second subspace in which the second gesture was detected; and manipulate the second graphical panel associated with the second application in response to the second pre-defined command.

16. The computing device of claim 13, further configured to:

send, by the computing device, an alternate display signal to a secondary computing device, wherein the alternate display signal comprises outlines of the first and second graphical panels and omits interior details of the first and second graphical panels; and display the alternate display signal on the secondary computing device and use rearrangement commands inputted to the secondary computing device to rearrange the first and second graphical panels on the display device.

\* \* \* \* \*

UNITED STATES PATENT AND TRADEMARK OFFICE
CERTIFICATE OF CORRECTION

PATENT NO. : 9,066,129 B2
APPLICATION NO. : 13/495262
DATED : June 23, 2015
INVENTOR(S) : Michael Connelly et al.

It is certified that error appears in the above-identified patent and that said Letters Patent is hereby corrected as shown below:

On the title page item 75

Column 1, Inventors, Line 5:
    Please delete "Bangalorg" and insert --Bangalore--

Column 1, Inventors, Line 7:
    Please delete "Bangalorg" and insert --Bangalore--

In the drawings

Sheet 7 of 11, FIG. 8:
    Insert --800-- in the top-center of the figure

Sheet 7 of 11, FIG. 8:
    Insert --801-- overtop the smaller gray box

Sheet 7 of 11, FIG. 8, Line 3:
    Insert --802-- overtop the larger gray box

Sheet 7 of 11, FIG. 8:
    Insert --803-- next to the right-facing triangle

In the specification

Column 12, Line 39:
    Delete "117" and insert --1117--

Signed and Sealed this
Seventeenth Day of May, 2016

Michelle K. Lee
*Director of the United States Patent and Trademark Office*

CERTIFICATE OF CORRECTION (continued)
U.S. Pat. No. 9,066,129 B2

In the claims

Column 13, Claim 1, Line 67:
    After "divided" delete "¶"

Column 14, Claim 7, Line 49:
    After "and" insert --¶--

Column 15, Claim 9, Line 9:
    After "and" insert --¶--